No. 610,233. Patented Sept. 6, 1898.
N. B. HARMON.
PNEUMATIC TIRE.
(Application filed Dec. 27, 1897.)

(No Model.)

Witnesses
Jno Tunie
Walter Williams

Inventor
Nathaniel B. Harmon
by Davis & Co
his Attorney

UNITED STATES PATENT OFFICE.

NATHANIEL B. HARMON, OF NEW YORK, N. Y.

PNEUMATIC TIRE.

SPECIFICATION forming part of Letters Patent No. 610,233, dated September 6, 1898.

Application filed December 27, 1897. Serial No. 663,585. (No model.)

*To all whom it may concern:*

Be it known that I, NATHANIEL B. HARMON, a citizen of the United States, residing at New York, in the county of New York and State of New York, have invented a certain new, useful, and valuable Improvement in Pneumatic Tires, of which the following is a full, clear, and exact description.

My present invention relates to pneumatic tires, and particularly to that class of bicycle-tires known as "detachable" tires.

Figure 1:
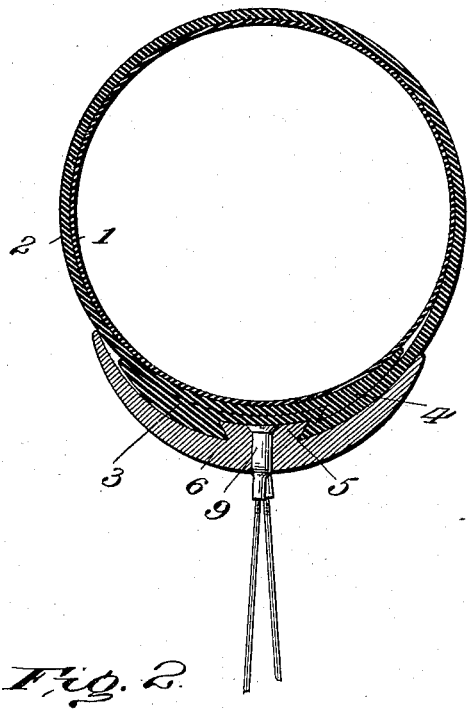
Figure 2:
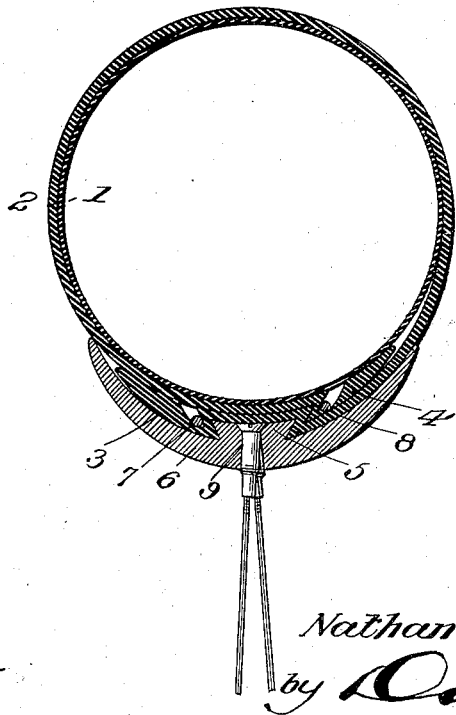

In the accompanying drawings, which form a part of this specification, Figure 1 is a transverse sectional view of one form of my improved tire and wheel-rim. Fig. 2 is a modification of the same.

Like numerals of reference indicate corresponding parts throughout the several views.

My improved tire may be formed of an interior tube of any well-known form, such as 1, surrounded by my improved cover 2, the lower overlapping edges 3 4 of which interlock with one another and with the centrally-located rib 5, formed upon the interior surface of the crescent-shaped rim 6, which may be of wood, metal, or other material.

In the form shown in Fig. 1 the claw-shaped interlocking and overlapping edges of the outer cover 2 are formed or cast directly in the rubber and webbing composing the material out of which the said outer cover is made, while in Fig. 2 the wires 7 8 act to interlock over the several points, as shown.

My improved rib 5 not only forms means upon which the edges of the outer cover lock, but it also reinforces the rim 6 in such a way that the caps 7, protruding therethrough, do not weaken the rim proportionately as much as is ordinarily done in other forms of tires which do not employ an enlarged portion or rib at the point where the caps or spokes protrude through the rim.

In both of my forms of improvements, as illustrated in Figs. 1 and 2, the *modus operandi* is to first secure the edge 3, as in Fig. 1, over the rib 5, as shown, then place the interior tube 1 in proper position without inflating it, then interlock the other edge 4 of the outer cover, as shown, and finally inflate the interior tube, which, as is obvious, further tends to lock the overlapping edges of the outer cover one with another and also with the raked edges of the rib 5, all as will be clearly understood from an inspection of the accompanying drawings.

When interlocking wires or bands 7 8 are used, it is preferable to hook or otherwise secure their ends together after placing in position.

Having now described my invention, in which various modifications may be made without avoiding the spirit thereof, what I claim as new, and desire to secure by Letters Patent, is—

1. In combination with a wheel-rim provided with a central projection or rib, of a tire having a groove along one edge which overlaps and engages with said projection, and the opposite edge of the tire also overlapping the projection and having a projecting claw which engages with a shoulder formed in the first-named edge of the tire.

2. In combination with a wheel-rim having a concaved outer face and a projecting rib surrounding the central concaved portion of the rim, said rib having undercut sides, of a rubber tire having a dovetail groove along one edge which fits snugly over the said projecting rib, the opposite edge of said tire being provided with a projecting claw which engages with the first-named edge of the tire over which it is lapped, and retaining-wires engaging the edges of the tire, said wires being located upon opposite sides of the projecting rib.

3. In combination with a wheel-rim provided with a central projection or rib having undercut sides, of a tire having a groove with similar undercut sides, said groove being arranged along one edge of the tire and adapted to overlap and engage with the said projection, and the opposite edge of the tire being provided with a projecting claw which interlocks with a shoulder on the first-named edge of the tire.

In testimony whereof I affix my signature in the presence of two witnesses.

NATHANIEL B. HARMON.

Witnesses:
   G. HOWLETT DAVIS,
   FRANK R. MARKS.